(12) United States Patent
Kim et al.

(10) Patent No.: US 8,421,417 B2
(45) Date of Patent: Apr. 16, 2013

(54) SECONDARY BATTERY CONTROL CIRCUIT

(75) Inventors: Bongyoung Kim, Suwon-si (KR);
Kyungwon Seo, Suwon-si (KR);
Yeongmi Kim, Suwon-si (KR); Sangjoo Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 298 days.

(21) Appl. No.: 12/805,801

(22) Filed: Aug. 19, 2010

(65) Prior Publication Data
US 2011/0043170 A1    Feb. 24, 2011

(30) Foreign Application Priority Data

Aug. 19, 2009 (KR) .................. 10-2009-0076660

(51) Int. Cl.
*H01M 10/46* (2006.01)
(52) U.S. Cl.
USPC .......................................... 320/134; 320/136
(58) Field of Classification Search .................. 320/107, 320/127, 128, 134, 136
See application file for complete search history.

(56) References Cited

U.S. PATENT DOCUMENTS

| | | | |
|---|---|---|---|
| 5,789,900 | A | 8/1998 | Hasegawa et al. |
| 6,608,470 | B1 * | 8/2003 | Oglesbee et al. ............. 320/136 |
| 7,456,611 | B2 * | 11/2008 | Mullett et al. ................ 320/130 |
| 2005/0127871 | A1 | 6/2005 | Orikasa |
| 2005/0156574 | A1 * | 7/2005 | Sato et al. ..................... 320/134 |
| 2005/0162131 | A1 | 7/2005 | Sennami et al. |
| 2008/0150475 | A1 | 6/2008 | Kato et al. |
| 2009/0121682 | A1 * | 5/2009 | Goto ............................. 320/134 |
| 2009/0295332 | A1 * | 12/2009 | Yang et al. ................... 320/132 |

FOREIGN PATENT DOCUMENTS

| | | |
|---|---|---|
| EP | 1772942 A2 | 4/2007 |
| JP | 08-138754 A | 5/1996 |
| JP | 2002-313439 A | 10/2002 |
| JP | 2005-130663 A | 5/2005 |
| JP | 2008-181494 A | 8/2008 |
| KR | 1020040019759 A | 3/2004 |
| KR | 1020050040737 A | 5/2005 |
| KR | 10-2006-0022558 A | 3/2006 |
| KR | 1020080043481 A | 5/2008 |
| KR | 10-2009-0026644 A | 3/2009 |
| KR | 10-2009-0026645 A | 3/2009 |
| KR | 10-2009-0081894 A | 7/2009 |

OTHER PUBLICATIONS

Japanese Office action issued by Japanese Patent Office on Oct. 25, 2011, corresponding to Japanese Patent Application No. 2009-258298 and Request for Entry attached herewith.
European Extended Search Report issued by EPO, dated Dec. 6, 2010 corresponding to Korean Patent Application No. 2009-0076660.
Korean Notice of Allowance issued by KIPO on Mar. 31, 2011 (Korean Application No. 10-2009-0076660. and "Request for Entry of the Accompanying Document" attached herewith.

\* cited by examiner

*Primary Examiner* — Edward Tso
(74) *Attorney, Agent, or Firm* — Robert E. Bushnell, Esq.

(57) ABSTRACT

A secondary battery that provides a usage voltage lower than a charged voltage. The secondary battery includes a chargeable/dischargeable battery cell, an external terminal electrically connected to the cell unit to charge and discharge the cell unit, and a protective circuit module including a current providing circuit. The protective circuit module electrically connects the cell unit to the external terminal. The current providing circuit includes a charge path and a discharge path that are separated from each other, a voltage drop unit dropping an output voltage of the cell unit to a usage voltage on the discharge path, and a reverse current preventing unit preventing reverse currents from flowing into the charge path and the discharge path.

17 Claims, 3 Drawing Sheets

SECONDARY BATTERY CONTROL CIRCUIT

CLAIM OF PRIORITY

This application makes reference to, incorporates into this specification the entire contents of, and claims all benefits accruing under 35 U.S.C. §119 from an application earlier filed in the Korean Intellectual Property Office filed on Aug. 19, 2009 and there duly assigned Serial No. 10-2009-0076660.

BACKGROUND OF THE INVENTION

1. Field of the Invention

Embodiments relate to a secondary battery.

2. Description of the Related Art

With the rapid development of electronics, communication and computer industries, portable electronic devices are now in widespread use. Rechargeable secondary batteries are mainly used as power sources of portable electronic devices.

Batteries having a pack configuration are now widely used as secondary batteries. A pack type battery includes a bare cell for storing and providing electric energy and a protective circuit module for controlling charge/discharge of the bare cell. The bare cell and the protective circuit are combined into one unit.

Among secondary batteries, lithium secondary batteries have an average operating voltage of 3.7 V. Thus, lithium secondary batteries are not compatible with existing AA and AAA-sized primary batteries, which have an operating voltage ranging from 1.2 V to 1.5 V.

SUMMARY OF THE INVENTION

It is therefore a feature of the present invention to provide an improved secondary battery.

It is another feature of the present invention to provide a secondary battery, which provides a usage voltage lower than a charged voltage.

It is still another feature of the present invention to provide a secondary battery, which provides a usage voltage lower than a charged voltage to prevent reverse current from flowing into a charge path and a discharge path.

It is a further feature of the present invention to provide a secondary battery, which provides a usage voltage lower than a charged voltage and a charge path and a discharge path connected to one electrode terminal.

At least one of the above and other features and advantages may be realized by providing a secondary battery constructed with a cell unit including a chargeable/dischargeable battery cell, an external terminal electrically connected to the cell unit to charge and discharge the cell unit, and a protective circuit module including a current providing circuit. The protective circuit module electrically connects the cell unit to the external terminal. The current providing circuit includes a charge path and a discharge path that are separated from each other, a voltage drop unit dropping an output voltage of the cell unit to a usage voltage on the discharge path, and a reverse current preventing unit preventing reverse currents from flowing into the charge path and the discharge path.

The voltage drop unit may include a step-down DC-DC converter.

The reverse current preventing unit may include a first diode disposed on the charge path in a forward direction with respect to a charge direction and a second diode disposed on the discharge path in a forward direction with respect to a discharge direction. The voltage drop unit may have an output voltage higher than the usage voltage by a voltage value dropped by the second diode. The second diode of the reverse current preventing unit may include a Schottky diode.

The reverse current preventing unit may include a first switching device disposed on the charge path and a second switching device disposed on the discharge path. The voltage drop unit may provide a control signal to the first switching device and the second switching device. At least one of the first switching device and the second switching device of the reverse current preventing unit may include a field-effect transistor.

The current providing circuit of the protective circuit module may further include a charge/discharge recognizing unit. The charge/discharge recognizing unit may include a recognizing resistor electrically connecting the voltage drop unit to the charge path or the discharge path.

The cell unit may include a plurality of battery cells electrically connected to each other.

The protective circuit module may further include a charge/discharge control circuit electrically connecting the cell unit to the current providing circuit, the charge/discharge control circuit switching charge and discharge operations.

The external terminal may include a first electrode terminal electrically connected to the charge path and the discharge path of the current providing circuit.

The external terminal may include a first charging electrode terminal electrically connected to the charge path, and a first discharging electrode terminal electrically connected to the discharge path.

The usage voltage may range from about 1.2 V to about 1.5 V.

The secondary battery may be compatible with an AA or AAA-sized primary battery.

At least one of the above and other features and advantages may be realized by providing a secondary battery constructed with a cell unit including at least one chargeable/dischargeable battery cell, an external terminal electrically connected to the cell unit to charge and discharge the cell unit, and a protective circuit module including a current providing circuit. The protective circuit module electrically connects the cell unit to the external terminal. The current providing circuit of the protective circuit module includes a charge path and a discharge path that are separated from each other, and a voltage drop unit dropping a voltage on the discharge path. The external terminal includes a first electrode terminal electrically connected to the charge path and the discharge path of the current providing circuit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Korean Patent Application No. 10-2009-0076660, filed on Aug. 19, 2009, in the Korean Intellectual Property Office, and entitled: "SECONDARY BATTERY" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
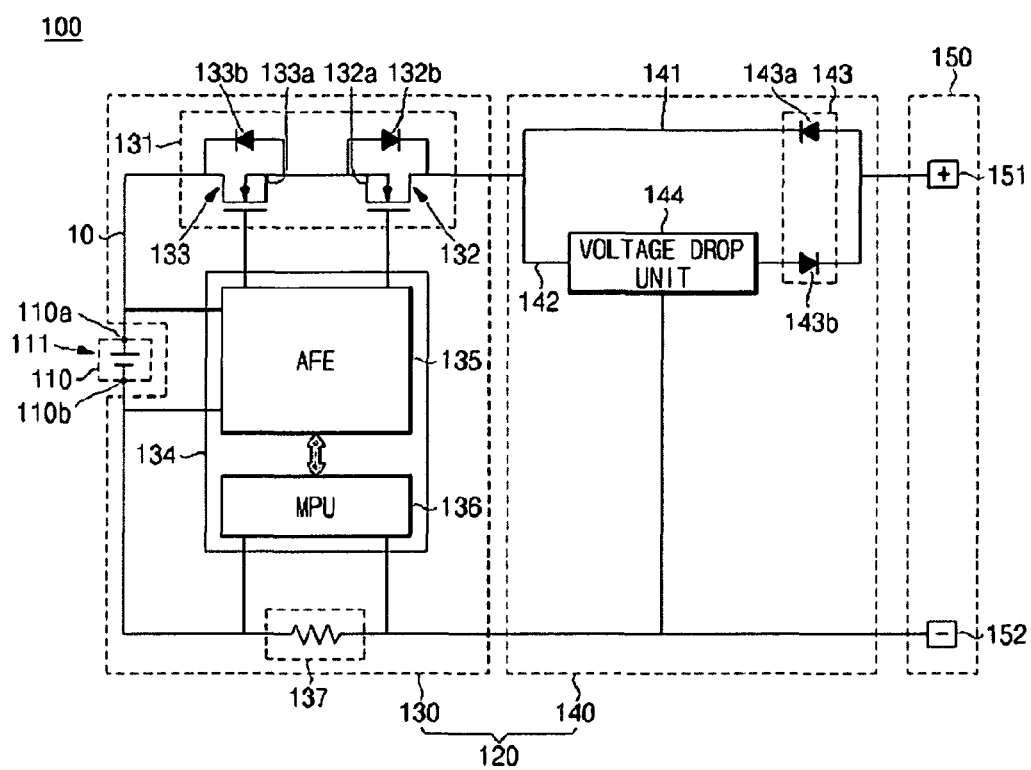
FIG. 1 illustrates a circuit view of a secondary battery as an embodiment according to the principles of the present invention.

FIG. 1 illustrates a circuit view of a secondary battery as an embodiment according to the principles of the present invention.

Referring to FIG. 1, a secondary battery 100 includes a cell unit 110, a protective circuit module 120, and an external terminal 150.

Cell unit 110 includes a battery cell 111. A first electrode 110a and a second electrode 110b are disposed in cell unit 110. Cell 110 repeatedly stores electric energy to provide the stored electric energy to an external load (not shown). Although first electrode 110a includes a positive electrode and second electrode 110b includes a negative electrode in this embodiment, they are not limited thereto. Also, although battery cell 111 includes a lithium secondary battery having an average operating voltage of 3.7 V in this embodiment, it is not limited thereto. For example, battery cell 111 may include different types of rechargeable batteries such as a lithium polymer battery. Although cell unit 110 includes one battery cell 111 in this embodiment, it is not limited thereto. For example, battery cell 110 may include two or more battery cells, which are connected in series, parallel or series-parallel, which is within the scope of the present invention.

Protective circuit module 120 includes a charge/discharge control circuit 130 and a current providing circuit 140. Protective circuit module 120 allows cell unit 110 to be electrically connected to external terminal 150 to control charge/discharge operations, thereby protecting secondary battery 100.

Charge/discharge control circuit 130 includes a charge/discharge switching part 131, a charge/discharge control part 134, and a current detecting part 137. Charge/discharge control circuit 130 controls charge/discharge operations of cell unit 110.

Charge/discharge switching part 131 includes a charge switching device 132 and a discharge switching device 133. Charge/discharge switching part 131 permits only a proper flow of current when cell unit 110 is charged and discharged.

Charge switching device 132 includes a charge field-effect transistor (FET) 132a and a parasitic diode 132b for charge FET 132a. Parasitic diode 132b is connected in parallel with charge FET 132a. Charge FET 132a is installed so that a drain and a source are disposed on a large current path 10 of cell unit 110. In this embodiment, large current path 10 denotes a path through which charging/discharging current of cell unit 110 flows. Charge FET 132a receives a control signal inputted from charge/discharge control part 134 through a gate of charge FET 132a and turns on or off in dependence upon the control signal. When cell unit 110 is charged, charge FET 132a turns on to apply charging current to cell unit 110.

Parasitic diode 132b for charge FET 132a is disposed in a direction opposite to a charging current direction. When charge FET 132a turns off, parasitic diode 132b for charge FET 132a interrupts the charging current and provides a path for discharging current.

Discharge switching device 133 includes a discharge FET 133a and a parasitic diode 133b for charge FET 133a. Parasitic diode 133b is connected in parallel with discharge FET 133a.

Discharge FET 133a is installed so that a drain and a source are disposed on large current path 10 of cell unit 110. Discharge FET 133a receives a control signal inputted from charge/discharge control part 134 through a gate of discharge FET 133a and turns on or off in dependence upon the control signal. When cell unit 110 is discharged, discharge FET 133a turns on to apply discharging current of cell unit 110 to an external load (not shown) through external terminal 150.

Parasitic diode 133b for discharge FET 133a is disposed in a direction opposite to a discharging current direction. When discharge FET 133a turns off, parasitic diode 133b for discharge FET 133a interrupts the discharging current and provides a path for the charging current.

Charge/discharge control part 134 includes an analog front end (AFE) 135 and a micro-processor unit (MPU) 136.

AFE 135 is electrically connected to first electrode 110a and second electrode 110b of cell unit 110. Also, AFE 135 is electrically connected to the gate of charge FET 132a and the gate of discharge FET 133a. AFE 135 detects an open circuit voltage of cell unit 110, which is a voltage difference between first electrode 110a and second electrode 110b of cell unit 110, to determine an overdischarge mode, a full discharge mode, a full charge mode, and an overcharge mode. As a result, charge FET 132a and discharge FET 133a of charge/discharge switching part 131 turn on or off according to the respective modes. In this case, a power control circuit for controlling charge/discharge switching part 131 is built in AFE 135.

AFE 135 is a type of application specific integrated circuit (ASIC). AFE 135 includes a power-operated circuit device for immediately detecting the open circuit voltage of cell unit 110 and operating charge/discharge switching device 131. Thus, AFE 135 allows charge FET 132a and discharge FET 133a of charge/discharge switching part 131 to turn on or off at a fast response speed according to the respective modes to primarily protect cell unit 110.

MPU 136 includes a micro processor (not shown), a passive device (not shown) electrically connected to the micro processor, an active device (not shown), and a memory (not shown). MPU 136 is electrically connected to AFE 135 to receive open circuit voltage data of cell unit 110 and detect the open circuit voltage of cell unit 110. Also, MPU 136 may change set voltages of the overdischarge mode, the full discharge mode, the full charge mode, and the overcharge mode, which are set in AFE 135. Also, MPU 136 outputs a control signal to AFE 135 to control charge/discharge switching part 131. MPU 136 calculates the charging current and the discharging current of cell unit 110. In this case, MPU 136 is electrically connected to both ends of current detecting device 137 to measure a degree of a voltage difference change between both ends of current detecting device 137, thereby calculating a current value.

Current detecting device 137 is disposed on large current path 10. Both ends of current detecting device 137 are electrically connected to MPU 136. In this embodiment, current detecting device 137 includes a sense resistor. MPU 136 measures the voltage difference between both ends of current detecting device 137 to calculate the charging current and the discharging current flowing on large current path 10.

Current providing circuit 140 includes a charge path 141, a discharge path 142, a reverse current preventing unit 143, and a voltage drop unit 144. Current providing circuit 140 provides proper charging current and proper discharging current.

Charge path 141 and discharge path 142 are electrically isolated from each other on large current path 10. Charge path 141 provides a path through which the charging current flows, and discharge path 142 provides a path through which the discharging current flows.

Reverse current preventing unit 143 includes a first diode 143*a* disposed on charge path 141 and a second diode 143*b* disposed on discharge path 142. Reverse current preventing unit 143 prevents reverse current from flowing into charge path 141 and discharge path 142. That is, reverse current preventing unit 143 prevents the discharging current from flowing into charge path 141 and prevents the charging current from flowing into discharge path 142.

First diode 143*a* is disposed on charge path 141 in a direction opposite to a discharge direction. That is, first diode 143*a* is disposed on charge path 141 in a forward direction with respect to a charge direction. Thus, first diode 143*a* prevents current flowing into charge path 141 from flowing in the discharge direction.

Second diode 143*b* is disposed on discharge path 142 in a direction opposite to the charge direction. That is, second diode 143*b* is disposed on discharge path 142 in a forward direction with respect to the discharge direction. Thus, second diode 143*b* prevents current flowing into discharge path 142 from flowing in the charge direction. In a case where second diode 143*b* includes a general diode, the voltage drop across the general diode is 0.7 V while the discharging current passes through second diode 143*b*. In a case where second diode 143*b* includes a Schottky diode, the voltage drop across the Schottky diode is 0.3 V while the discharging current passes through second diode 143*b*.

Voltage drop unit 144 is disposed on discharge path 142 to drop an output voltage of cell unit 110 to a desired voltage, thereby discharging the dropped voltage as a usage voltage. The usage voltage is a discharging voltage output by secondary battery 100 to an external load (not shown). In this embodiment, voltage drop unit 144 includes a step-down DC-DC converter (not shown) of a typical configuration. A step-down DC-DC converter is an electronic circuit which converts a source of direct current (DC) from a first voltage level to a second and lower voltage level. Voltage drop unit 144 is disposed in front of second diode 143*b* of reverse current preventing unit 143 with respect to the discharge direction on discharge path 142. That is, voltage drop unit 144 and second diode 143*b* of reverse current preventing unit 143 are sequentially disposed along the discharge direction on discharge path 142 such that the discharge current first flows through voltage drop unit 144 and then flows through second diode 143*b* of reverse current preventing unit 143. An output voltage of voltage drop unit 144 is determined in consideration of the desired usage voltage and the voltage drop due to second diode 143*b*. In the case where second diode 143*b* includes the general diode, voltage drop unit 144 outputs a voltage, which is about 0.7 V higher than the desired discharging voltage in consideration of a degree of voltage drop due to the general diode. Alternatively, in the case where second diode 143*b* includes the Schottky diode, voltage drop unit 144 outputs a voltage, which is about 0.3 V higher than the desired discharging voltage in consideration of a degree of voltage drop due to the Schottky diode.

External terminal 150 includes a first electrode terminal 151 and a second electrode terminal 152. An external device such as a charger (not shown) or an external load (not shown) for charging and discharging is electrically connected to external terminal 150. Although not shown, external terminal 150 may further include a third terminal (not shown). The third terminal (not shown) is connected to charge/discharge control part 134. Charge/discharge control part 134 receives and transmits data required for charging and discharging, through the third terminal (not shown) from/to the charger (not shown) or the external load (not shown).

First electrode terminal 151 is electrically connected to charge path 141 and discharge path 142 of current providing circuit 140. First electrode terminal 151 is electrically connected to first electrode 110*a* of cell unit 110 on large current path 10 to serve as a positive terminal for charging and discharging. Since charge path 141 and discharge path 142 of current providing circuit 140 are electrically connected together to first electrode terminal 151, first electrode terminal 151 facilitates the usage of charge path 141 and discharge path 142.

Second electrode terminal 152 is electrically connected to a second electrode 110*b* of cell unit 110 on large current path 10 to serve as a negative terminal for charging and discharging.

An operation of the above-described embodiment will be described in detail with reference to FIG. 1. In this embodiment, a charging voltage is set to about 4.2 V, and the usage voltage discharged through external terminal 150 is set to about 1.5 V. In the overcharge mode, a voltage across cell unit 110 ranges from about 4.2 V to about 4.3 V. In the overdischarge mode, a voltage across cell unit 110 ranges from about 2.3 V to about 2.6 V. When a current ranging from about 2 A to about 6 A flows on large current path 10, this is defined as a case in which an overcurrent flows.

A charge operation of secondary battery 100 will be described. For charging secondary battery 100, external terminal 150 of secondary battery 100 is electrically connected to the charger (not shown). When the charger (not shown) is connected to secondary battery 100, charge switching device 132 of charge/discharge control circuit 130 turns on, and discharge switching device 133 turns off. In this case, the charge operation is performed at about 4.2 V and 0.5 C through first electrode terminal 151 and second electrode terminal 152 of external terminal 150. The charging current flows into cell unit 110 through charge path 141 of current providing circuit 140. Here, the charging current does not flow into discharge path 142 due to second diode 143*b* disposed on discharge path 142 of current providing circuit 140. In a case where a voltage across cell unit 110 ranges from about 4.2 V to about 4.3 V, secondary battery 100 is in the overcharge mode. Thus, charge switching device 132 turns off to stop the charge operation. Also, in a case where current ranging from about 2 A to about 6 A, which corresponds to the overcurrent, flows in large current path 10, charge switching device 132 turns off to stop the charge operation.

A discharge operation of secondary battery 100 will be described. For discharging secondary battery 100, the external load (not shown) is electrically connected to external terminal 150 of secondary battery 100. When the external load (not shown) is connected to secondary battery 100, discharge switching device 133 of charge/discharge control circuit 130 turns on, and charge switching device 132 turns off. Voltage drop unit 144 of current providing circuit 140 drops the output voltage of cell unit 110. The output voltage of voltage drop unit 144 is determined in consideration of the voltage drop due to second diode 143*b*. In the case where second diode 143*b* includes the general diode, voltage drop unit 144 outputs a voltage of about 2.2 V, which is 0.7 V higher than 1.5 V (that is the usage voltage) in consideration of the degree of voltage drop due to the general diode. Also, in the case where second diode 143*b* includes the Schottky diode, voltage drop unit 144 outputs a voltage of about 1.8 V, which is 0.3 V higher than 1.5 V (that is the usage voltage) in consideration of the degree of voltage drop due to the Schottky diode. Here, the discharging current does not flow into charge path 141 due to first diode 143a disposed on charge path 141 of current providing circuit 140. The voltage of about 1.5 V (that is the usage voltage) is applied to first electrode terminal 151 and second electrode terminal 152 of external terminal 150. In a case where a voltage across cell unit 110 ranges from about 2.3 V to about 2.6 V, secondary battery 100 is in overdischarge mode. Thus, discharge switching device 133 turns off to stop the discharge operation. Also, in a case where the current ranging from about 2 A to about 6 A that corresponds to the overcurrent flows in large current path 10, discharge switching device 133 turns off to stop the discharge operation.

Figure 2:
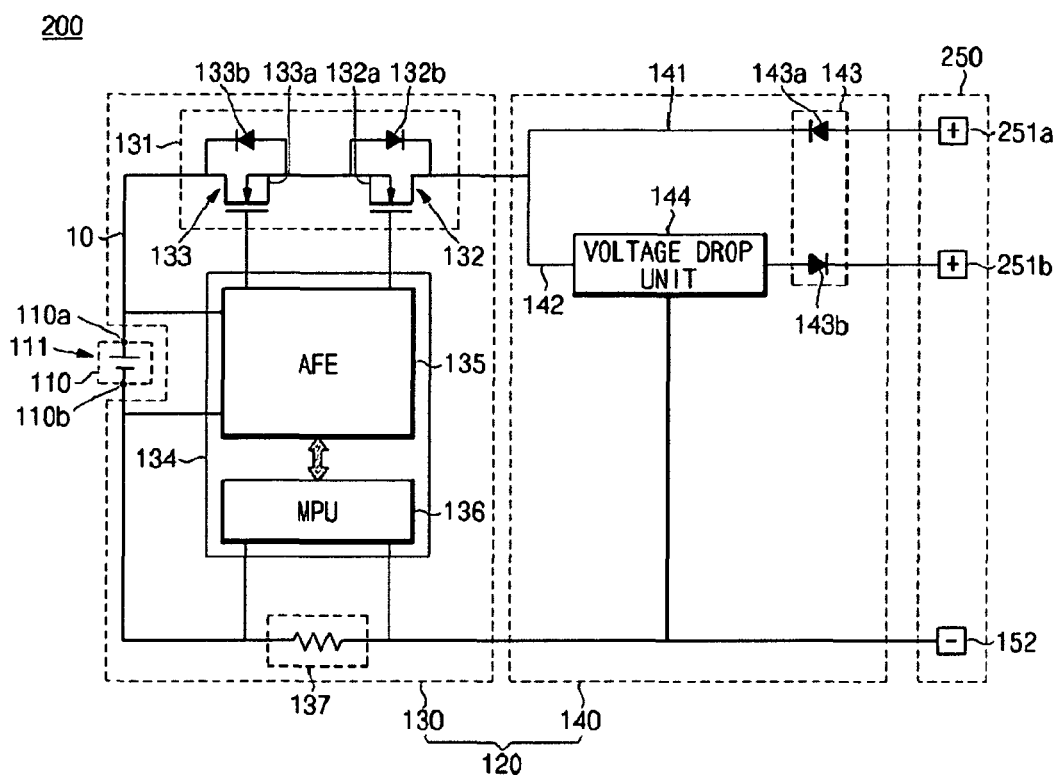
FIG. 2 illustrates a circuit view of a secondary battery as another embodiment according to the principles of the present invention.

FIG. 2 illustrates a circuit view of a secondary battery as another embodiment according to the principles of the present invention.

Referring to FIG. 2, a secondary battery 200 includes a cell unit 110, a protective circuit module 120, and an external terminal 250. Cell unit 110 and protective circuit module 120 have the same configuration and operation as those of the embodiment described with reference to FIG. 1. Thus, its detailed description will be omitted.

External terminal 250 includes a first charging electrode terminal 251a, a first discharging electrode terminal 251b, and a second electrode terminal 152. First charging electrode terminal 251a is electrically connected to a charge path 141 of a current providing circuit 140. First discharging electrode terminal 251b is electrically connected to a discharge path 142 of current providing circuit 140. Second electrode terminal 152 has the same configuration and operation as those of the embodiment described with reference to FIG. 1. Thus, its detailed description will be omitted.

A charger (not shown) is electrically connected to first charging electrode terminal 251a and second electrode terminal 152 to perform a charge operation of secondary battery 200. An external load (not shown) is electrically connected to first discharging electrode terminal 251b and second electrode terminal 152 to perform a discharge operation of secondary battery 200.

Other components except the above-described components have the same configuration and operation as those of the embodiment described with reference to FIG. 1. Thus, their detailed descriptions will be omitted.

Figure 3:
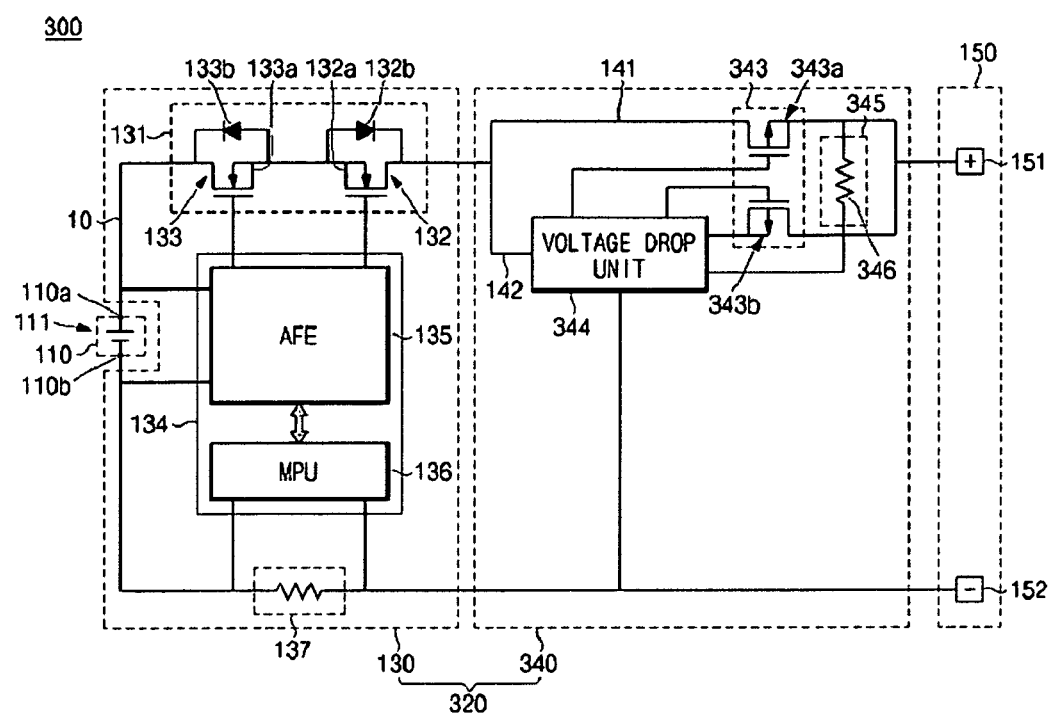
FIG. 3 illustrates a circuit view of a secondary battery as another embodiment according to the principles of the present invention.

FIG. 3 illustrates a circuit view of a secondary battery as another embodiment according to the principles of the present invention.

Referring to FIG. 3, a secondary battery 300 includes a cell unit 110, a protective circuit module 320, and an external terminal 150. Cell unit 110 and external terminal 150 have the same configuration and operation as those of the embodiment described with reference to FIG. 1. Thus, their detailed descriptions will be omitted.

Protective circuit module 320 includes a charge/discharge control circuit 130 and a current providing circuit 340. Since charge/discharge control circuit 130 has the same configuration and operation as those of the embodiment described with reference to FIG. 1, its detailed description will be omitted. Current providing circuit 340 includes a charge path 141, a discharge path 142, a reverse current preventing unit 343, a voltage drop unit 344, and a charge/discharge recognizing unit 345. Since charge path 141 and discharge path 142 have the same configuration and operation as those of the embodiment described with reference to FIG. 1, their detailed descriptions will be omitted.

Reverse current preventing unit 343 includes a first switching device 343a disposed on charge path 141 and a second switching device 343b disposed on discharge path 142. In this embodiment, each one of first switching device 343a and second switching device 343b includes a FET. When cell unit 110 is charged, first switching device 343a disposed on charge path 141 turns on, and second switching device 343b disposed on discharge path 142 turns off. When discharged, second switching device 343b disposed on discharge path 142 turns on, and first switching device 343a disposed on charge path 141 turns off. Thus, reverse current preventing unit 343 prevents reverse current from flowing into charge path 141 and discharge path 142. Voltage drop unit 344 recognizes charge and discharge states from charge/discharge recognizing unit 345 to output a control signal into first switching device 343a and second switching device 343b of reverse current preventing unit 343. Charge/discharge recognizing unit 345 includes a recognizing resistor 346 for electrically connecting charge path 141 to voltage drop unit 344. Voltage drop unit 344 detects a voltage across recognizing resistor 346 to recognize the charge and discharge states.

Other components except the above-described components have the same configuration and operation as those of the embodiment described with reference to FIG. 1. Thus, their detailed descriptions will be omitted.

The above-described features and advantages may be realized according to the embodiments. According to the embodiments, since the secondary battery provides the discharge voltage lower than the charge voltage, the secondary battery may be compatible with existing primary batteries.

Also, according to the embodiments, since the secondary battery provides the discharge voltage lower than the charge voltage and prevents the reverse current from flowing into the charge path and the discharge path, stable charge/discharge operations are realized.

Also, according to the embodiments, since the secondary battery provides the discharge voltage lower than the charge voltage and allows the charge path and the discharge path to be connected to one electrode terminal, the secondary battery is easily connected to an external device.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
    a cell unit comprising a chargeable/dischargeable battery cell;
    an external terminal electrically connected to the cell unit to charge and discharge the cell unit; and
    a protective circuit module comprising a current providing circuit to electrically connect the cell unit to the external terminal,
    the current providing circuit comprising:
        a charge path and a discharge path that are separated from each other;
        a voltage drop unit disposed on the discharge path and dropping an output voltage of the cell unit into a usage voltage; and
        a reverse current preventing unit preventing reverse currents from flowing into the charge path and the discharge path.

2. The secondary battery as claimed in claim 1, wherein the voltage drop unit comprises a step-down DC-DC converter.

3. The secondary battery as claimed in claim 1, wherein the reverse current preventing unit comprises a first diode disposed on the charge path in a forward direction with respect to a charge direction, and a second diode disposed on the discharge path in a forward direction with respect to a discharge direction.

4. The secondary battery as claimed in claim 3, wherein the voltage drop unit has an output voltage higher than the usage voltage by a voltage value dropped by the second diode.

5. The secondary battery as claimed in claim 3, wherein the second diode of the reverse current preventing unit comprises a Schottky diode.

6. The secondary battery as claimed in claim 1, wherein the reverse current preventing unit comprises a first switching device disposed on the charge path and a second switching device disposed on the discharge path.

7. The secondary battery as claimed in claim 6, wherein the voltage drop unit provides a control signal to the first switching device and the second switching device.

8. The secondary battery as claimed in claim 6, wherein at least one of the first switching device and the second switching device of the reverse current preventing unit comprises a field-effect transistor.

9. The secondary battery as claimed in claim 1, wherein the current providing circuit of the protective circuit module further comprises a charge/discharge recognizing unit.

10. The secondary battery as claimed in claim 9, wherein the charge/discharge recognizing unit comprises a recognizing resistor electrically connecting the voltage drop unit to one of the charge path and the discharge path.

11. The secondary battery as claimed in claim 1, wherein the cell unit comprises a plurality of battery cells electrically connected to each other.

12. The secondary battery as claimed in claim 1, wherein the protective circuit module further comprises a charge/discharge control circuit electrically connecting the cell unit to the current providing circuit, the charge/discharge control circuit switching charge and discharge operations.

13. The secondary battery as claimed in claim 1, wherein the external terminal comprises a first electrode terminal electrically connected to the charge path and the discharge path of the current providing circuit.

14. The secondary battery as claimed in claim 1, wherein the external terminal comprises a first charging electrode terminal electrically connected to the charge path and a first discharging electrode terminal electrically connected to the discharge path.

15. The secondary battery as claimed in claim 1, wherein the usage voltage ranges from about 1.2 V to about 1.5 V.

16. The secondary battery as claimed in claim 1, wherein the secondary battery is compatible with an AA or AAA-sized primary battery.

17. A secondary battery comprising:
a cell unit comprising at least one chargeable/dischargeable battery cell;
an external terminal electrically connected to the cell unit to charge and discharge the cell unit; and
a protective circuit module comprising a current providing circuit to electrically connect the cell unit to the external terminal,
the current providing circuit of the protective circuit module comprises a charge path and a discharge path that are separated from each other, and a voltage drop unit dropping a voltage on the discharge path,
the external terminal comprises a first electrode terminal electrically connected together with the charge path and the discharge path of the current providing circuit.

* * * * *